US009432925B2

(12) United States Patent
Kasslin et al.

(10) Patent No.: US 9,432,925 B2
(45) Date of Patent: Aug. 30, 2016

(54) METHOD, APPARATUS, AND COMPUTER PROGRAM PRODUCT FOR HOP COUNT USAGE IN CLUSTER SELECTION

(71) Applicant: Nokia Corporation, Espoo (FI)

(72) Inventors: Mika Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 115 days.

(21) Appl. No.: 14/448,035

(22) Filed: Jul. 31, 2014

(65) Prior Publication Data

US 2015/0036540 A1 Feb. 5, 2015

Related U.S. Application Data

(60) Provisional application No. 61/862,186, filed on Aug. 5, 2013.

(51) Int. Cl.

| H04L 12/28 | (2006.01) |
|---|---|
| H04W 48/18 | (2009.01) |
| H04W 48/16 | (2009.01) |
| H04W 56/00 | (2009.01) |
| H04W 84/18 | (2009.01) |
| H04B 7/26 | (2006.01) |

(52) U.S. Cl.
CPC ............ H04W 48/18 (2013.01); H04W 48/16 (2013.01); H04W 56/0015 (2013.01); H04B 7/2678 (2013.01); H04W 84/18 (2013.01)

(58) Field of Classification Search
USPC .......... 370/254–350, 503–520; 455/456–507
See application file for complete search history.

(56) References Cited

U.S. PATENT DOCUMENTS

| 5,844,900 A | 12/1998 | Hong et al. |
| 6,292,508 B1 | 9/2001 | Hong et al. |
| 6,466,608 B1 | 10/2002 | Hong et al. |
| 6,842,460 B1 * | 1/2005 | Olkkonen ............. H04W 48/16 370/328 |

(Continued)

FOREIGN PATENT DOCUMENTS

| WO | WO9524081 | 9/1995 |
| WO | WO2009018212 | 2/2009 |
| WO | WO2012011991 | 1/2012 |

OTHER PUBLICATIONS

European Search Report for Application No. 14179629.2-1855 / 2835915 dated Apr. 3, 2015.

*Primary Examiner* — Man Phan
(74) *Attorney, Agent, or Firm* — Locke Lord LLP

(57) ABSTRACT

Embodiments enable access to a wireless communications medium. In example embodiments, a method comprises receiving first synchronization messages from a wireless device transmitting synchronization messages in a first neighbor awareness network cluster, the first synchronization messages including a first hop count value to a first anchor master in the first cluster and information describing a first master rank value of the first anchor master; receiving second synchronization messages from a wireless device transmitting synchronization messages in a second neighbor awareness network cluster, the second synchronization messages including a second hop count value to a second anchor master in the second cluster and information describing a second master rank value of the second anchor master; and selecting the first neighbor awareness network cluster or the second neighbor awareness network cluster, based on at least one of the first and second hop count values and the first and second master rank values.

17 Claims, 7 Drawing Sheets

(56) References Cited

U.S. PATENT DOCUMENTS

| | | | |
|---|---|---|---|
| 7,809,835 B2* | 10/2010 | Reunamaki | H04W 84/18 455/464 |
| 8,571,519 B2 | 10/2013 | Ginzboorg | |
| 8,879,992 B2 | 11/2014 | Kneckt et al. | |
| 9,049,578 B2* | 6/2015 | Abraham | H04W 4/206 |
| 9,204,244 B2* | 12/2015 | Rantala | H04W 4/008 |
| 2002/0044549 A1 | 4/2002 | Johansson et al. | |
| 2004/0221046 A1 | 11/2004 | Heinonen et al. | |
| 2007/0086424 A1 | 4/2007 | Calcev et al. | |
| 2008/0253327 A1 | 10/2008 | Kohvakka et al. | |
| 2009/0215457 A1 | 8/2009 | Wang et al. | |
| 2009/0313310 A1 | 12/2009 | Thome et al. | |
| 2010/0113042 A1 | 5/2010 | Kasslin et al. | |
| 2010/0165875 A1 | 7/2010 | Kneckt et al. | |
| 2010/0226297 A1 | 9/2010 | Kasslin et al. | |
| 2010/0304759 A1 | 12/2010 | Leppanen et al. | |
| 2011/0223937 A1 | 9/2011 | Leppanen et al. | |
| 2012/0176941 A1 | 7/2012 | Bata et al. | |
| 2013/0072248 A1 | 3/2013 | Bajko | |
| 2014/0254566 A1* | 9/2014 | Qi | H04W 56/00 370/336 |
| 2014/0313966 A1* | 10/2014 | Shukla | H04W 48/10 370/312 |
| 2014/0341073 A1* | 11/2014 | Abraham | H04W 48/18 370/254 |
| 2014/0376519 A1* | 12/2014 | Yang | H04W 74/0816 370/336 |
| 2015/0098388 A1* | 4/2015 | Fang | H04W 48/18 370/328 |
| 2015/0172391 A1* | 6/2015 | Kasslin | H04L 67/16 370/338 |
| 2015/0200811 A1* | 7/2015 | Kasslin | H04L 41/12 370/254 |
| 2015/0382301 A1* | 12/2015 | Huang | H04W 52/0229 370/311 |

* cited by examiner

FIG. 2

| BEACON | DESTINATION ADDRESS | SOURCE ADDRESS | CLUSTER ID | ANCHOR MASTER TSF | HOP COUNT TO ANCHOR | MASTER RANK OF ANCHOR MASTER | MASTER RANK OF SENDER | ...... | CRC |
|---|---|---|---|---|---|---|---|---|---|
| 140 | 232 | 234 | 236 | 238 | 240 | 242 | 244 | | 246 |

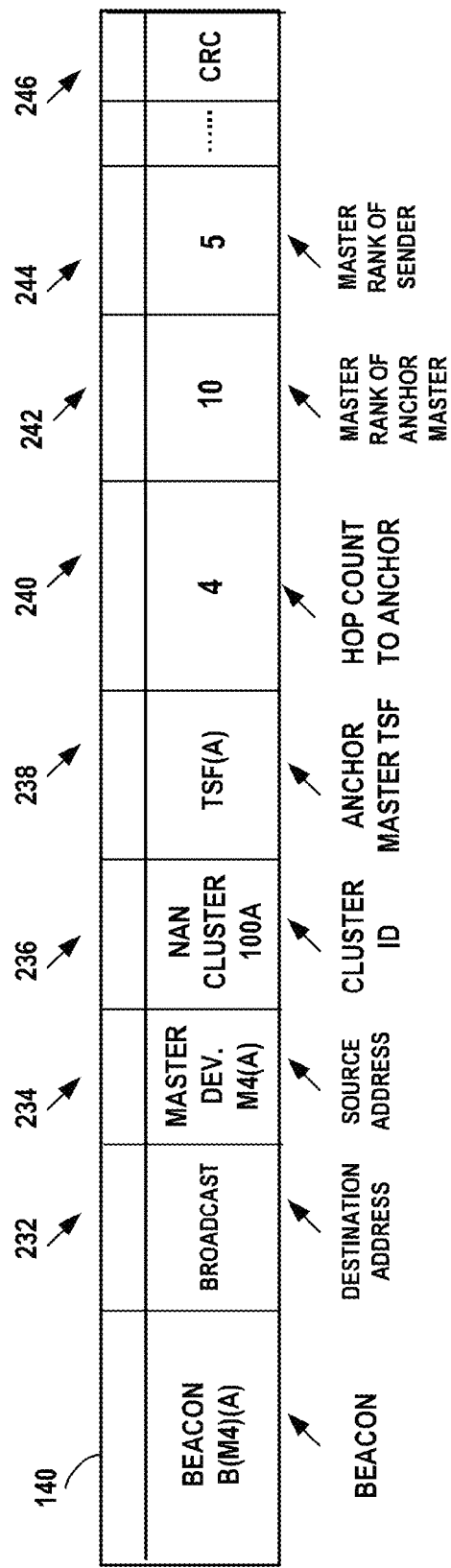

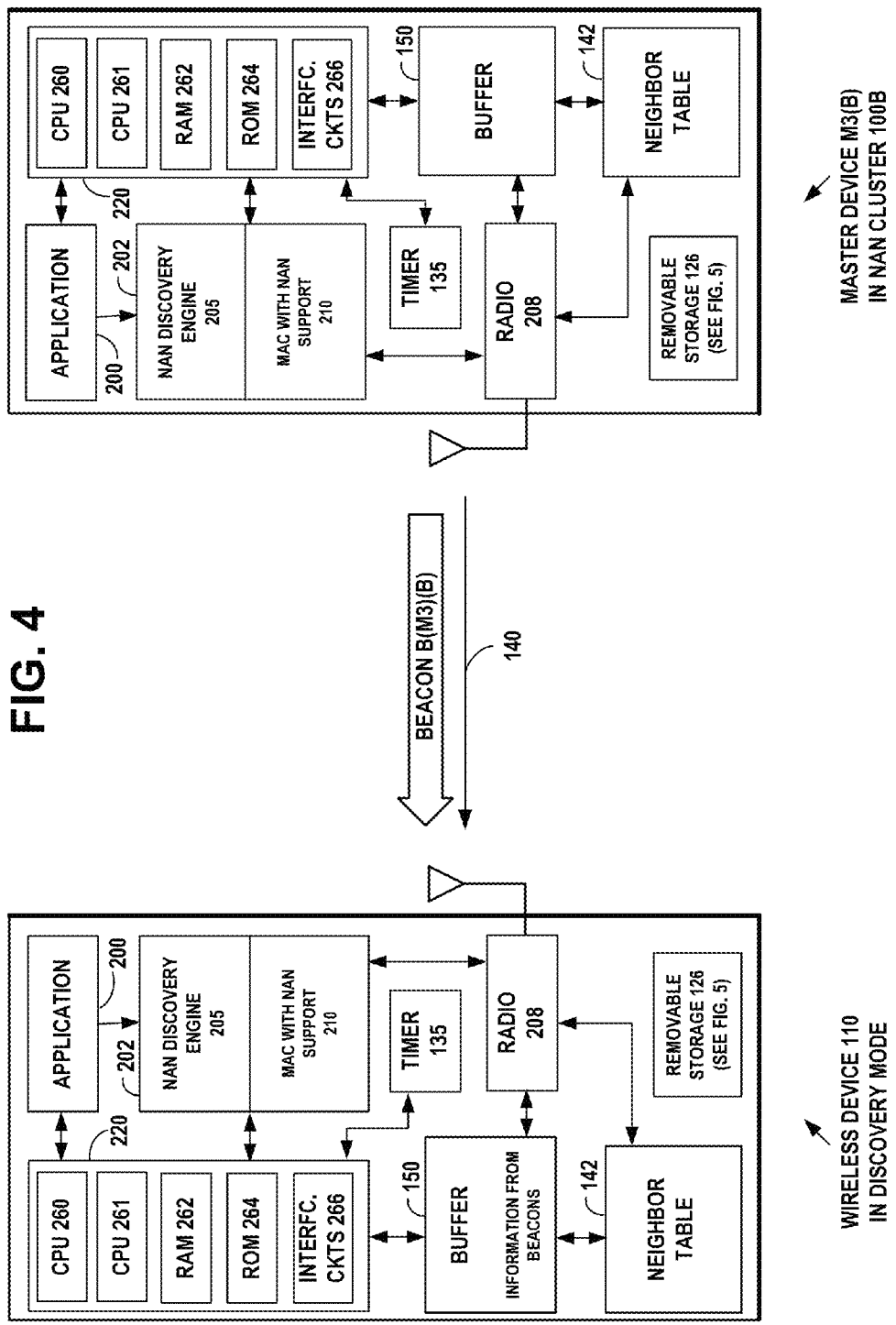

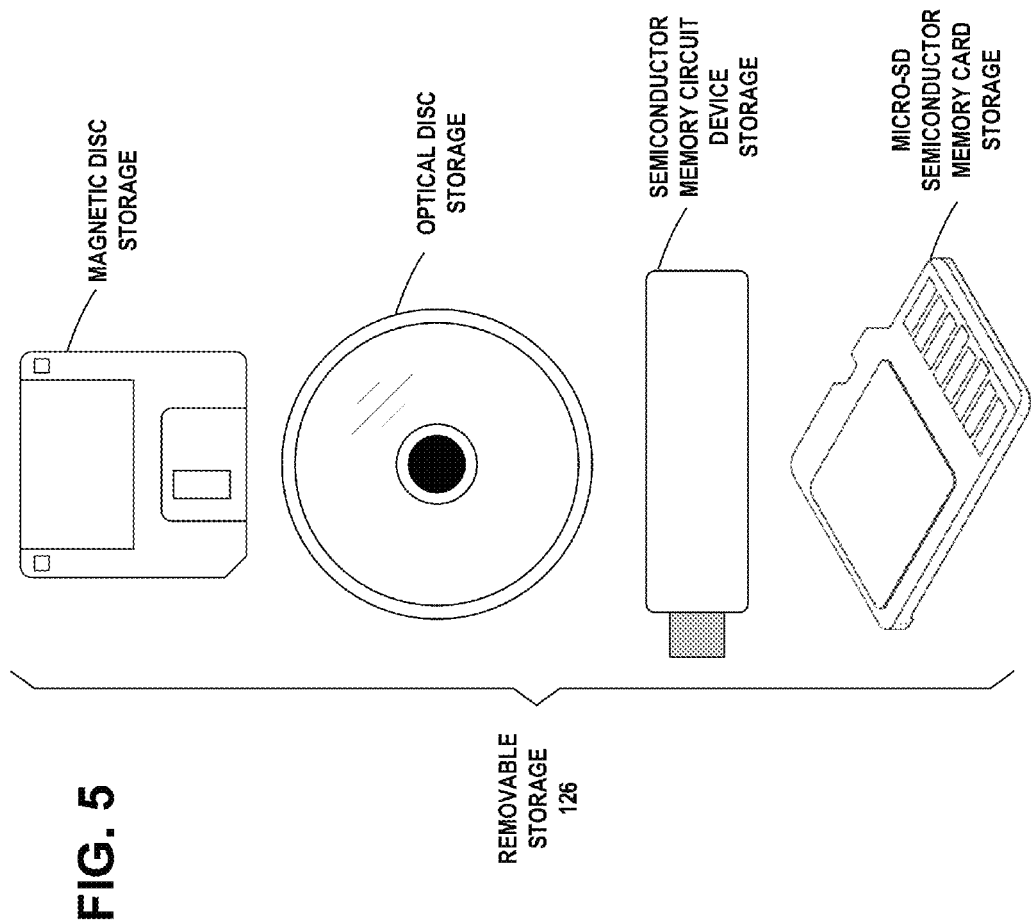

METHOD, APPARATUS, AND COMPUTER PROGRAM PRODUCT FOR HOP COUNT USAGE IN CLUSTER SELECTION

PRIORITY

This application claims the benefit of priority of U.S. Provisional Patent Application Ser. No. 61/862,186, filed Aug. 5, 2013, the disclosure of which is being incorporated herein by reference in its entirety.

FIELD

The field of the invention relates to wireless short-range communication and more particularly to selection of a cluster of devices of a wireless communications medium.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable determination of a type of a wireless communications medium.

According to an example embodiment of the invention, a method comprises:

receiving, by an apparatus, one or more first synchronization messages from a wireless device transmitting synchronization messages in a first neighbor awareness network cluster, the first synchronization message including a first hop count value to a first anchor master in the first cluster and information describing a first master rank value of the first anchor master;

receiving, by the apparatus, one or more second synchronization messages from a wireless device transmitting synchronization messages in a second neighbor awareness network cluster, the second synchronization message including a second hop count value to a second anchor master in the second cluster and information describing a second master rank value of the second anchor master; and selecting, by the apparatus, the first neighbor awareness network cluster or the second neighbor awareness network cluster, based on at least one of the first and second hop count values and the first and second master rank values.

According to an example embodiment of the invention, a method comprises:

comparing, by the apparatus, the first and second hop count values and selecting the neighbor awareness network cluster corresponding to the synchronization message having the lower hop count value.

According to an example embodiment of the invention, a method comprises:

comparing, by the apparatus, the first and second master rank values and selecting the neighbor awareness network cluster corresponding to the synchronization message having the greater master rank value.

According to an example embodiment of the invention, a method comprises:

comparing, by the apparatus, the first and second hop count values and hop count values in synchronization messages received from one or more other neighbor awareness network cluster and selecting the neighbor awareness network cluster corresponding to the synchronization message having the lowest hop count value.

According to an example embodiment of the invention, a method comprises:

comparing, by the apparatus, the first and second master rank values and master rank values in synchronization messages received from one or more other neighbor awareness network cluster and selecting the neighbor awareness network cluster corresponding to the synchronization messages having the highest master rank value.

According to an example embodiment of the invention, a method comprises:

comparing, by the apparatus, the first and second hop count values and operating in the neighbor awareness network cluster corresponding to the synchronization message having the lower hop count value.

According to an example embodiment of the invention, a method comprises:

comparing, by the apparatus, the first and second master rank values and operating in the neighbor awareness network cluster corresponding to the synchronization message having the greater master rank value.

According to an example embodiment of the invention, a method comprises:

performing, by the apparatus, passive scanning of the synchronization messages.

According to an example embodiment of the invention, an apparatus comprises:

at least one processor;

at least one memory including computer program code;

the at least one memory and the computer program code configured to, with the at least one processor, cause the apparatus at least to:

receive one or more first synchronization messages from a wireless device transmitting synchronization messages in a first neighbor awareness network cluster, the first synchronization message including a first hop count value to a first anchor master in the first cluster and information describing a first master rank value of the first anchor master;

receive one or more second synchronization messages from a wireless device transmitting synchronization messages in a second neighbor awareness network cluster, the second synchronization message including a second hop count value to a second anchor master in the second cluster and information describing a second master rank value of the second anchor master; and select the first neighbor awareness network cluster or the second neighbor awareness network cluster, based on at least one of the first and second hop count values and the first and second master rank values.

According to an example embodiment of the invention, an apparatus comprises:

the at least one memory and the computer program code configured to, with the at least one processor, cause the apparatus at least to:

compare the first and second hop count values and selecting the neighbor awareness network cluster corresponding to the synchronization message having the lower hop count value.

According to an example embodiment of the invention, an apparatus comprises:

the at least one memory and the computer program code configured to, with the at least one processor, cause the apparatus at least to:

compare the first and second master rank values and selecting the neighbor awareness network cluster corresponding to the synchronization message having the greater master rank value.

According to an example embodiment of the invention, an apparatus comprises:

the at least one memory and the computer program code configured to, with the at least one processor, cause the apparatus at least to:

compare the first and second hop count values and hop count values in synchronization messages received from one or more other neighbor awareness network cluster and selecting the neighbor awareness network cluster corresponding to the synchronization message having the lowest hop count value.

According to an example embodiment of the invention, an apparatus comprises:

the at least one memory and the computer program code configured to, with the at least one processor, cause the apparatus at least to:

compare the first and second master rank values and master rank values in synchronization messages received from one or more other neighbor awareness network cluster and selecting the neighbor awareness network cluster corresponding to the synchronization messages having the highest master rank value.

According to an example embodiment of the invention, an apparatus comprises:

the at least one memory and the computer program code configured to, with the at least one processor, cause the apparatus at least to:

compare the first and second hop count values and operating in the neighbor awareness network cluster corresponding to the synchronization message having the lower hop count value.

According to an example embodiment of the invention, an apparatus comprises:

the at least one memory and the computer program code configured to, with the at least one processor, cause the apparatus at least to:

compare the first and second master rank values and operating in the neighbor awareness network cluster corresponding to the synchronization message having the greater master rank value.

According to an example embodiment of the invention, an apparatus comprises:

the at least one memory and the computer program code configured to, with the at least one processor, cause the apparatus at least to:

perform, by the apparatus, passive scanning of the synchronization messages.

According to an example embodiment of the invention, a computer program product comprises computer executable program code recorded on a computer readable non-transitory storage medium, the computer executable program code comprising:

code for receiving, by an apparatus, one or more first synchronization messages from a wireless device transmitting synchronization messages in a first neighbor awareness network cluster, the first synchronization message including a first hop count value to a first anchor master in the first cluster and information describing a first master rank value of the first anchor master;

code for receiving, by the apparatus, one or more second synchronization messages from a wireless device transmitting synchronization messages in a second neighbor awareness network cluster, the second synchronization message including a second hop count value to a second anchor master in the second cluster and information describing a second master rank value of the second anchor master; and code for selecting, by the apparatus, the first neighbor awareness network cluster or the second neighbor awareness network cluster, based on at least one of the first and second hop count values and the first and second master rank values.

According to an example embodiment of the invention, a computer program product comprises:

code for comparing, by the apparatus, the first and second hop count values and selecting the neighbor awareness network cluster corresponding to the synchronization message having the lower hop count value.

According to an example embodiment of the invention, a computer program product comprises:

code for comparing, by the apparatus, the first and second master rank values and selecting the neighbor awareness network cluster corresponding to the synchronization message having the greater master rank value.

According to an example embodiment of the invention, a computer program product comprises:

code for performing, by the apparatus, passive scanning of the synchronization messages.

The resulting example embodiments enable selection of a cluster of devices of a wireless communications medium.

DESCRIPTION OF THE FIGURES

FIG. 2 shows an example format of a beacon packet transmitted by master device in nan cluster, in accordance with at least one embodiment of the present invention.

FIG. 2A shows the example format of a beacon packet of FIG. 2, transmitted by a master device in a first NAN cluster, the beacon including a first hop count of value 4 and a master rank value of 10 for the anchor master in that cluster, in accordance with at least one embodiment of the present invention.

FIG. 4 is an example functional block diagram of the wireless device 110 in discovery mode receiving a beacon from a master device in one of the NAN clusters, in accordance with at least one embodiment of the present invention.

FIG. 5 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

DISCUSSION OF EXAMPLE EMBODIMENTS OF THE INVENTION

Figure 1:
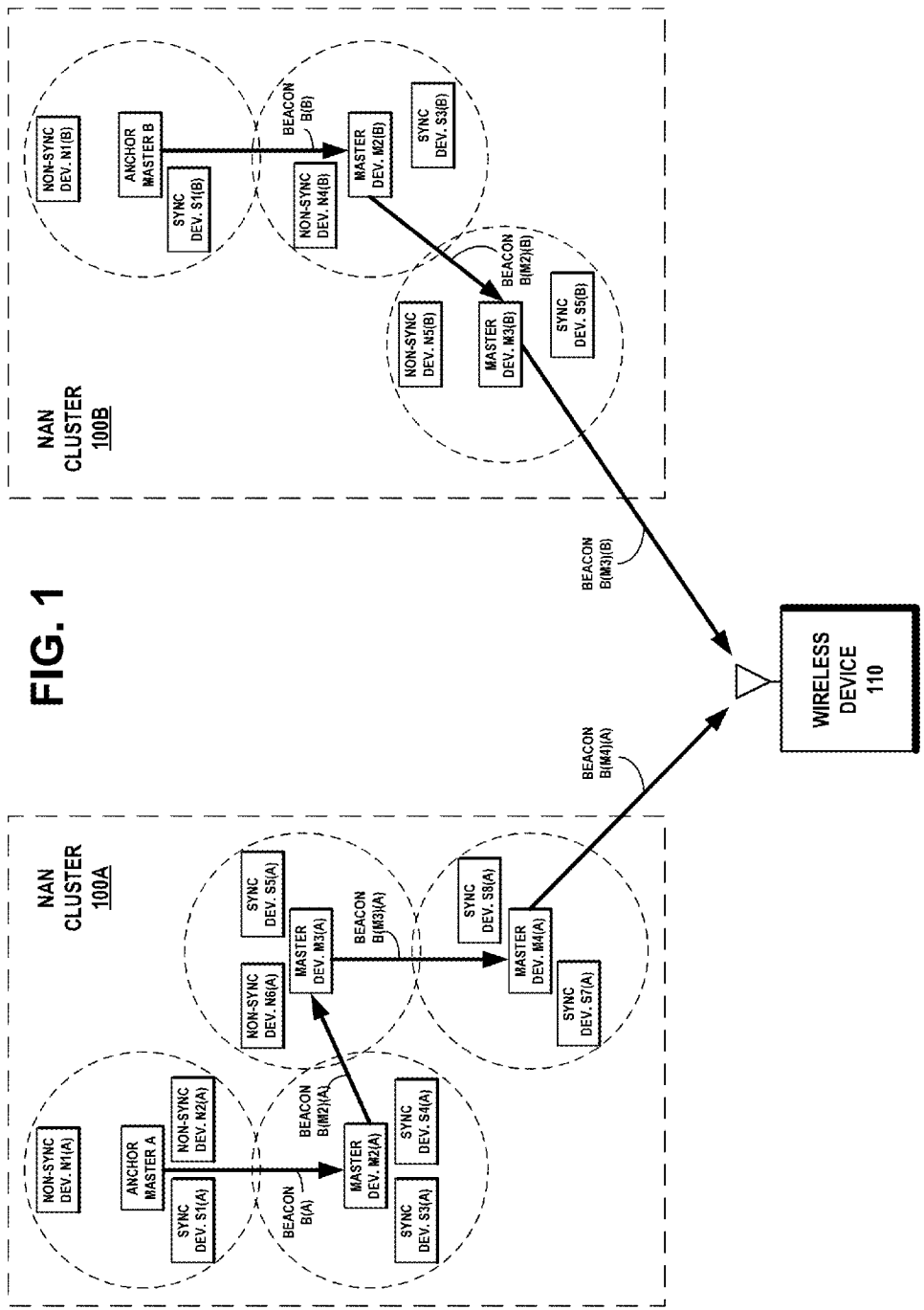
FIG. 1 illustrates an example network diagram of two neighbor awareness network (NAN) clusters and a wireless device in discovery mode. Each NAN cluster includes an anchor master whose TSF (time synchronization function) value is distributed in beacon frames to all the devices in the cluster. Other master devices in the cluster follow the anchor master and distribute the anchor master's synchronization information within the cluster by transmitting beacon frames. The sequence of an anchor master and one or more other masters in the cluster, which follow the anchor master's TSF, forms a multi-hop cluster. The information about the hop count distance to the anchor master is communicated in the beacon frame transmitted by each master. The hop count is incremented by one as each master consecutively transmits its beacon in the hop sequence, in accordance with at least one embodiment of the present invention.

This section is organized into the following topics:
A. WLAN Communication Technology
B. Awareness Network Technology
C. Neighbor Awareness Networking (NAN)
D. Hop Count Usage in NAN Cluster Selection A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012. Since then, emerging broadband applications have stimulated interest in developing very high-speed wireless networks for short range communication, for example, the planned IEEE 802.11 ac, and the planned IEEE 802.11 ad WLAN specifications that are to provide a very high throughput in various frequency bands. Applications of these IEEE 802.11 standards include products such as consumer electronics, telephones, personal computers, and access points for both for home and office.

A WLAN may be organized as an independent basic service set (IBSS) or an infrastructure basic service set (BSS). Wireless devices or stations (STAs) in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format is identical to that of an IEEE 48-bit address. In an ad hoc network, the BSSID is a locally administered, individual address that is generated randomly by the device that starts the ad hoc network.

Synchronization is the process of the devices in an ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a device joins the ad hoc network. This process is entirely distributed in ad hoc networks, and relies on a common time base provided by a timing synchronization function (TSF). The TSF may maintain a 64-bit timer running at 1 MHz and updated by information from other devices. When a device begins operation, it may reset the timer to zero. The timer may be updated by information received in beacon frames.

Each wireless device or STA maintains a TSF timer with modulus $2^{64}$ counting in increments of microseconds. STAs expect to receive Beacon frames at a nominal rate. The interval between Beacon frames is defined by a Beacon Period parameter of the STA. A STA sending a Beacon frame sets the value of the Beacon frame's timestamp so that it equals the value of the STA's TSF timer at the time that the data symbol containing the first bit of the timestamp is transmitted to the PHY plus the transmitting STA's delays through its local PHY from the MAC-PHY interface to its interface with the antenna or light-emitting diode (LED) emission surface.

In an ad hoc network, since there is no access point (AP) to act as the central time source for the ad hoc network, the timer synchronization mechanism is completely distributed among the mobile devices of the ad hoc network. Since there is no AP, the mobile device that starts the ad hoc network will begin by resetting its TSF timer to zero and transmitting a Beacon, choosing a beacon period. This establishes the basic beaconing process for this ad hoc network. After the ad hoc network has been established, each device in the ad hoc network will attempt to send a Beacon after the target beacon transmission time (TBTT) arrives. To minimize actual collisions of the transmitted Beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process is a purely local process that occurs entirely internal to the mobile device. There is no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

There are three major types of medium access control (MAC) frames in the IEEE 802.11 protocol: the management frame, the control frame, and the data frame. Management frames provide management services. Data frames carry payload data. Control frames assist in the delivery of data and management frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

1. Beacon

The beacon frame is a management frame that is transmitted periodically to allow mobile devices to locate and identify an ad hoc network. Beacon generation in an IBSS is distributed. The value of the beacon period is included in Beacon and Probe Response frames, and devices or STAs adopt that beacon period when joining the IBSS. All members of the IBSS participate in beacon generation. Each STA maintains its own TSF timer that is used for Beacon Period timing. The beacon interval within an IBSS is established by the STA when the START request primitive is performed within a device to create the IBSS. This defines a series of target beacon transmission times (TBTT) exactly a Beacon Period apart, which is the time at which an ad hoc device must send a beacon. Time zero is defined to be a TBTT. At each TBTT the STA waits for the random backoff interval and then sends a Beacon frame if the random delay has expired and no other Beacon frame has arrived from the IBSS of which the STA is a member during the delay period.

The beacon frame includes the fields: timestamp, beacon interval, and capability information. The timestamp contains the value of the device's synchronization timer (TSF) at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, an optional ad hoc network parameter set, and an optional traffic indication map. There is no restriction on the format or content of the 32 byte SSID.

The first ad hoc device to become active establishes an IBSS and starts sending beacons that to maintain synchronization among the devices. Other ad hoc devices may join the network after receiving a beacon and accepting the IBSS parameters, such as the beacon interval, found in the beacon frame.

Each device that joins the ad hoc network may send a beacon periodically if it doesn't hear a beacon from another device within a short random delay period after the beacon is supposed to be sent. If a device doesn't hear a beacon within the random delay period, then the device assumes that no other devices are active and a beacon needs to be sent. A beacon signal is periodically transmitted from the ad hoc network. The beacon frame is transmitted periodically and includes the address of the sending device.

2. Probe Request

The probe request frame is a management frame that is transmitted by a mobile device attempting to quickly locate a wireless LAN. It may be used to locate a wireless LAN with a particular SSID or to locate any wireless LAN. The probe request frame may contain the service attribute request. The effect of receiving a probe request is to cause the device to respond with a probe response. When a wireless device arrives within the communication range of any member of an ad hoc network, its probe request frame inquiry signals are answered by a member of the ad hoc network detecting the inquiry. A device in an ad hoc network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

For active scans, the WLAN radio may broadcast a probe request on the medium it is scanning using a broadcast SSID in the probe request. The WLAN radio will add any received beacons or probe responses to a cached basic service set identifier (BSSID) scan list. For passive scans, the WLAN radio does not send a probe request, but instead, listens on a medium for a period of time and adds any received beacons or probe responses to its cached BSSID scan list. The WLAN radio may scan both infrastructure and ad hoc networks, regardless of the current setting of its network mode. The WLAN radio may use either the active or passive scanning methods, or a combination of both scanning methods. When performing an active scan, the WLAN radio sets the BSSID to the broadcast MAC address in the probe request it sends. The WLAN radio performs the scan across all the frequency mediums and bands that it supports.

3. Probe Response

Devices or STAs in an IBSS respond to probe requests if it is awake at a given time to receive and respond to the probe requests. In an IBSS, a STA that sent a Beacon frame remains in the Awake state and responds to probe requests, until a Beacon frame with the current BSSID is received. There may be more than one STA in an IBSS that responds to any given probe request, particularly in cases where more than one STA transmitted a Beacon frame following the most recent TBTT, either due to not receiving successfully a previous Beacon frame or due to collisions between beacon transmissions. In an IBSS, STAs receiving Probe Request frames respond with a probe response when the SSID in the probe request is the wildcard SSID or matches the specific SSID of the STA. In an IBSS a STA that transmitted a Beacon frame since the last TBTT responds to group addressed Probe Request frames. A STA in an IBSS responds to Probe Request frames sent to the individual address of the STA. Probe Response frames are sent as directed frames to the address of the STA that generated the probe request.

4. Carrier Sense Multiple Access with Collision Avoidance (CSMA/CA)

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

In a block acknowledgement (BA), instead of transmitting an individual ACK for every MAC protocol data unit (MPDU), multiple MPDUs may be acknowledged together using a single BA frame. Block Ack (BA) contains bitmap size of 64*16 bits. Each bit of this bitmap represents the success or failure status of a MPDU.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

IEEE 802.11 wireless devices normally employ Carrier Sense Multiple Access (CSMA), wherein a spectrum sensing capability is used during an interval like the SIFS interval, DIFS interval or AIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle. Binary exponential backoff may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially.

The mobile device that starts an ad hoc network will begin by resetting its TSF timer to zero and transmitting a Beacon, choosing a beacon period, which establishes the basic beaconing process for this ad hoc network. After the ad hoc network has been established, each device in the ad hoc network will attempt to send a Beacon after the target beacon transmission time (TBTT) arrives, choosing a random delay value to avoid collisions. Each device in a beacon group receives a beacon including timing synchronization of the beacon group of which the device is a member. The synchronized devices in the beacon group should be simultaneously available during a discovery interval to listen for and to exchange messages. Discovery intervals may be aligned with TBTTs. The beginning of a discovery interval may be aligned with a TBTT or alternatively, a discovery interval may be deemed to start upon reception or transmission of a beacon after a TBTT.

5. Synchronization

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TBTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

6. Quality of Service (QoS)

The Quality of Service (QoS) support in the IEEE 802.11 WLAN protocol is provided by access categories (ACs) and multiple independent backoff entities. The Quality of Service (QoS) support defines the MAC procedures to support local area network (LAN) applications with quality of service (QoS) requirements, including the transport of voice, audio, and video.

Packets are delivered by parallel backoff entities operating within the same WLAN device, where backoff entities are prioritized using AC-specific contention parameters. There are four access categories (ACs) and thus, four backoff entities exist in every WLAN device. The AC-specific contention parameters are labeled according to their target application: AC_VO for voice or audio packets, AC_VI for video packets, AC_BE for packets whose delivery is on a best effort basis, and AC_BK for background packets. The four access categories (ACs) define the priorities in accessing the medium by setting individual interframe spaces, contention windows, and other medium access parameters per access category (AC).

Contention-based medium access is performed in every backoff entity by using different parameter values for the AC-specific contention parameters. The AC-specific contention parameters are announced via information fields in beacon frames. The same AC-specific contention parameters are used by the backoff entities different WLAN devices in the network.

Each backoff entity within a WLAN device independently contends for a transmit opportunity (TXOP) of a packet. It starts down-counting the backoff-counter after detecting the medium being idle for a duration defined by the arbitration interframe space (AIFS) that is based on the value of the AC-specific contention parameter of the packet to be transmitted. The arbitration interframe space (AIFS) defines the earliest access time that the WLAN device may transmit the packet. Voice packets that have the AC-specific contention parameter AC_VO and video packets that have the AC-specific contention parameter AC_VI have a high value for access priority. Best effort basis packets that have the AC-specific contention parameter AC_BE have a medium value for access priority. Background packets that have the AC-specific contention parameter AC_BK have a low value for access priority.

The minimum size of the contention window, CWmin, for transmission of a packet, is another parameter dependent on the AC-specific contention parameter. The smaller the CWmin, the higher the priority of the packet for accessing the medium. Voice packets that have the AC-specific contention parameter AC_VO have the smallest contention window whereas background packets that have the AC-specific contention parameter AC_BK have the longest contention window.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon a scheme in which every device is responsible for participating in beaconing and all the other basic operations that keep the ad hoc network in operation. An ad hoc network may be designed to have one network identifier (NWID) that all of the devices in the network share. The NWID may be announced in the beacons transmitted by the devices. In the overall design, those devices that operate under same NWID are driven to use a common and shared schedule to allow for awareness information gathering among all the devices within range. The determination of which schedule is used by a device may be made by the network instance timer value, and this timer value is communicated in beacons in the timing synchronization function (TSF) value parameter. The devices may be required to operate by assuming the oldest TSF value (i.e. largest TSF value) contained in the received beacons that represent the network with the NWID in which the devices are operating. Alternatively the devices may be required to select the schedule which to follow based on some other criteria than the TSF value. Beacons may, as an example, contain some other information than the TSF that is used by the devices to determine which schedule to use.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network. Alternatively the beacon response message may contain other information that is used to determine which schedule to use.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device. Alternatively a merging decision may be done based on some other information available in a Beacon or beacon response message from another wireless device. After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness API. The approximate functional split between the different layers is as follows.

Awareness Layer

According to an embodiment, Awareness Layer (AwL) has the highest level of control of the awareness architecture. Example services the AwL offers to the applications comprise Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer may comprise an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

According to an example embodiment, Awareness architecture comprises three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and receive awareness community messages (public community). In a peer community all members are equal and every member may receive all the community specific messages. A peer community may be public, or it may be private meaning that community messages are encrypted using a temporary key derived from the community specific shared key. The encryption function may be based on Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members may be encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices may retransmit each message (normal flooding). The awareness network has a flat hierarchy; none of the devices may assume any special roles. Thus, at high densities, all the devices will transmit approximately the same amount of traffic (no clustering). The Network layer may also take care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer may be divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given medium using the TransmitData functionality. Transmission may succeed or it may fail. Internally the Link Layer may try transmissions several times if a medium is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC example, the LLC does the following WLAN MAC specific actions:

Control (Reset, Configure) WLAN MAC.
Decide when to merge WLAN networks.
Construct a message package to be sent to WLAN MAC from outgoing messages.
Select which messages are to be sent and which are ignored immediately, e.g. if there are too many messages to be sent.
Extract incoming data messages contained in reception reports.
Update the Neighbor Table when reception reports and scan reports are received.

Merging of WLAN networks may be the responsibility of the logical link control (LLC). The LLC may determine when to merge two WLAN network instances or beacon groups as a single larger network instance or a beacon group. LLC may calculate an estimate of its own WLAN network size. Estimation may be based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

According to an embodiment, the merging or joining process is a purely local process that occurs entirely internally to the wireless device. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:

Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages
Message Propagation According to an embodiment, the propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

C. Neighbor Awareness Networking (NAN)

In accordance with an example embodiment, the invention may be used in the logical architecture of the Neighbor Awareness Networking (NAN) program being standardized by the Wi-Fi Alliance (WFA). The NAN protocol stack is expected to comprise of two components: 1) NAN Discovery Engine, 2) MAC with NAN support. MAC with NAN support provides means for NAN devices to synchronize in time and frequency to provide common availability periods for service discovery frames from/to the NAN Discovery Engine.

NAN Discovery Engine

The NAN Discovery Engine provides Publish and Subscribe services to the applications for service discovery purposes.

Publishing is the ability to make application-selected information about e.g. capabilities and services available for other NAN devices that seek information with Subscribing, using protocols and mechanisms certified by the Neighbor Awareness Networking program. NAN devices that use Publishing may provide published information in an unsolicited or solicited manner.

Subscribing is the ability to discover information that has been made available in other NAN devices with Publishing, using protocols and mechanisms certified by the Neighbor Awareness Networking program. NAN devices that use Subscribing may passively listen for or actively seek published information.

An application may request Publish and Subscribe services to run in a certain type of NAN network, in any type of NAN network, or in all types of NAN networks. The NAN network type selection determines whether the discovered Publish and Subscribe services are intended to happen in isolated clusters, among the NAN devices that are close by, or among all the NAN devices that are within range of the NAN device. Network type selection, per NAN Discovery Engine service, is reflected in the lower levels of the NAN stack, handling the NAN network and cluster selection functions. When a Publish/Subscribe service has been configured to run in one type of network, corresponding functionality and discovery protocol message exchanges are made to happen only in a network of the same type. As discussed herein, the terms cell and cluster refer to the same thing.

Publish and Subscribe services are expected to exploit a discovery protocol that the NAN Discovery Engine implements and which is designed for NAN. The protocol is expected to have three different protocol messages: 1) Discovery query message, 2) Discovery response message, and 3) Discovery announcement message. The Subscribe service is expected to use the Discovery query message to conduct active discovery. The Subscribe service may be configured to operate in passive mode only. In this mode, no Discovery query messages are transmitted, but one listens for Discovery responses and Discovery announcement messages to find the information sought. The Publishing service is expected to use the Discovery response message and Discovery announcement message to announce availability of application-selected information to discovering devices. The Discovery response message is intended to be used as a response to a received Discovery query that meets response criteria. The Discovery announcement message is intended to be used to implement unsolicited Publishing service.

A device in which the Subscribe service has been activated in active mode, transmits Discovery query messages to trigger Publishing devices to transmit Discovery response messages. In parallel, the Subscribing device monitors received Discovery responses and Discovery announcement messages to determine the availability of services and information being sought. Monitoring is envisioned to be a continuous process that applies to all Discovery response and Discovery announcement messages received while the Subscribe service is active. With this approach, a Subscribing device may gather valuable information from Discovery responses and from Discovery announcement messages that are independent from its own Discovery query message transmissions.

MAC with NAN Support

The MAC is responsible for acquiring and maintaining time and frequency synchronization among devices that are close by, so that the devices are available for discovery protocol message exchange in same channel at same time. Synchronization happens through dedicated synchronization frames that are transmitted by so called master devices (on default) at the beginning of the availability periods. Sync frames are transmitted periodically in certain channels. Periodicity and channel usage is determined by sync frame parameters. Each device needs to be capable of acting as a master device and each device is expected to determine for each availability period whether it is a master device or not. This determination is done through a master election algorithm. The synchronization frames determine the schedule (time and frequency) of both the synchronization frame transmissions and the availability periods or discovery windows.

A NAN network is comprised of a set of NAN devices that operate under a common network identifier (NAN ID) and that share common sync frame and discovery window parameters. A NAN network comprises of one or more NAN clusters. Each NAN cluster may be a contention group or beacon group and may be considered a local representation of a NAN network. A NAN cluster is comprised of a set of NAN devices that operate in a NAN network with one NAN ID and which are synchronized with respect to both the sync frame transmissions and the discovery windows. In order for NAN devices to form a NAN cluster, at least some of them need to be within range of each other. The NAN ID is carried at least in synchronization frames that may be of a beacon frame format. Each beacon contains a NAN ID field that is used in a NAN device receiving a beacon, to determine, as an example, whether the beacon is from a NAN network in which the NAN device is operating and from what type of NAN network the beacon was transmitted. In one embodiment of the invention, the NAN ID is a numerical value that is indicated with a 6-octet field in beacons or in synchronization frames used in the NAN networks, to provide basic synchronization within NAN clusters. In one embodiment of the invention, there is no NAN cluster identifier that would be carried in beacon frames, but NAN cells are differentiated with different schedules especially from perspective of sync frame (beacon) schedule.

Basic Principles of NAN Operations:

Upon activating the NAN functions in a device, the device first looks for a NAN network by means of passive discovery. The NAN functions are activated by an application in the device requesting either the Subscribe or the Publish service to be activated, when there is no service active in the NAN Discovery Engine.

a) On default there is at least one NAN ID that is determined in a NAN specification and the NAN device looks for such a network and its clusters.

Joining a NAN network/NAN cluster: If the device finds at least one NAN cluster that the device may join, the device selects a cluster and joins it. If the device finds no NAN cluster that the device may join, the device establishes a NAN cluster of its own. An application may have also requested the Publish service to be activated in a passive mode. In such case the device doesn't ever establish a NAN cluster, but it only operates in NAN clusters that have been established by others.
  a) A NAN device may join a NAN cluster when the following criterion is met:
    1. The device receives at least one sync frame from the cluster with signal level exceeding a pre-determined threshold RSSI_C (e.g. −50 dBm).

Upon joining a NAN cluster a NAN device synchronizes itself both to the sync frame transmission and discovery window schedule of the cluster.
  a) Additionally, the device is responsible for running the master election algorithm to determine whether it is a master device that is responsible for transmitting a sync frame.

Once in a NAN cluster, a NAN device may continue operating in it, as long as one of the following criteria is met:
  a) The device receives at least one sync frame from the cluster with signal level exceeding a pre-determined threshold RSSI_C (e.g. −50 dBm).
  b) The device operates as a master device transmitting sync frames.

When operating in a NAN cluster, a NAN device is responsible for maintaining both the base clock of the cluster by transmitting sync frames as needed and the discovery window schedule of the cluster.

Additionally, a NAN device is responsible for conducting passive discovery once a while to figure out whether there are other NAN clusters within range that that the device should consider joining
  a) When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:
    1. If the sync frame from the foreign cluster contains parameter values that indicate preference of the foreign cluster over one's own cluster, the device moves its operations to the foreign cluster.
    2. Otherwise the device continues its operations in the current cluster.

Neighbor Awareness Networking Network

A NAN network is comprised of a set of NAN devices that operate under a common network identifier (NAN ID) and that share common sync frame and discovery window parameters.

A NAN network is comprised of one or more NAN clusters.

In accordance with an example embodiment of the invention, two NAN network types are defined:
  a) Network of synchronized clusters.
  b) Network of isolated clusters.

Network identifier (NAN ID) depends on the network type.
  a) In a preferred implementation the NAN specification determines at least two NAN ID values and for each ID value the specification also determines the network type.

The network type determines whether discovery window schedules are aligned across cluster borders (network of synchronized clusters) or whether discovery window schedules are local to the cluster with the objective to especially keep adjacent/overlapping clusters unsynchronized from the perspective of discovery windows.
  a) In a network of synchronized clusters, the objective is to maximize use of one and same discovery window schedule.
  b) In a network of isolated clusters, the objective is to keep the clusters operating with their own discovery window schedules, so that only those devices that operate in same cluster are available for NAN discovery frames at a same time, in a same channel.

Cluster

A set of NAN devices that operate in a NAN network with one NAN ID and that are synchronized with respect to both the sync frame transmissions and the discovery windows form a NAN cluster.

In order for NAN devices to form a NAN cluster, at least some of them need to be within range of each other.

Synchronization within a NAN cluster means that the devices share the burden of sync frame transmission and are available simultaneously for NAN discovery during discovery windows.

Depending on whether a cluster belongs to a network of synchronized clusters or to a network of isolated clusters, the NAN devices moving from a cluster to another have certain obligations that are discussed in more detail later.

Sync Frames

Sync frames form the basis of time and frequency synchronization in the NAN network. All the NAN devices are responsible for participating in sync frame transmission, as per master role selection rules.

Sync frames are transmitted as per sync frame parameters that determine how often and in which channel(s) the frames are transmitted.

Sync frames provide a base clock for NAN devices and the base clock is used as the reference when specifying the discovery window schedule.

The base clock builds upon the time synchronization function (TSF) that is used in WLAN, and each sync frame is expected to contain a TSF timestamp value indicator.

A sync frame may be realized as a Beacon frame.

Discovery Window

A discovery window is a time period during which NAN devices are available for NAN discovery frame exchange.

Discovery windows happen as per discovery window parameters that determine how often and in which channel(s) the windows happen.

Discovery window schedule builds upon the information available in sync frames.

Discovery window schedule may be NAN cluster specific or same across NAN cluster borders depending on the NAN network type.

Device Operations in a NAN Network

Upon activating the NAN in a device, the device first looks for a NAN network by means of passive discovery.

On default, there is one default NAN ID that is determined in a NAN specification and the NAN device looks for such a network and its clusters.

Joining a NAN network/NAN cluster:
If the device finds at least one NAN cluster that the device may join, the device selects a cluster and joins it.

If the device finds no NAN cluster that the device may join, the device establishes a NAN cluster of its own. If the NAN Discovery Engine has been requested to activate the Subscribe service in a passive mode, the device may also decide not to establish a NAN cluster of its own, but it only operates in NAN clusters it discovers.

When a NAN device operates in a NAN cluster, it periodically conducts passive discovery to find out whether other NAN clusters of the NAN network in which the device operates, are available.

Joining a NAN Cluster

A NAN device may join a NAN cluster when the following criterion is met:
The device receives at least one sync frame from the cluster with signal level exceeding a pre-determined threshold RSSI_C (e.g. −50 dBm).

Upon joining a NAN cluster, a NAN device synchronizes itself both to the sync frame transmission and discovery window schedule of the cluster.

Additionally, the device is responsible for running the master election algorithm to determine whether it is a master device that is responsible for transmitting a sync frame.

Operating in a NAN Cluster

A NAN device may continue operating in a NAN cluster as long as one of the following criteria is met:
The device receives at least one sync frame from the cluster with signal level exceeding a pre-determined threshold RSSI_C (e.g. −50 dBm).
The device operates as a master device transmitting sync frames.

When operating in a NAN cluster, a NAN device is responsible for maintaining both the base clock of the cluster by transmitting sync frames as needed, and the discovery window schedule of the cluster.

Master Election

In accordance with an example embodiment of the invention, a node, device, or STA may operate in one of two roles: As a Master Sync STA, it competes with other Master STAs to transmit a Beacon. As a Non-Master Sync STA, it does not compete to transmit a Beacon. The Master Sync STA role may be determined by the Master Election Algorithm for Neighbor Awareness Networking. Every node, device, or STA of an ad hoc network may need to be able to operate in both roles and the Master Election Algorithm may need to be run by every node, device, or STA once in a while or periodically.

A NAN device that operates in a NAN cluster may need to be responsible for determining for each discovery window, as per the master election algorithm, whether it is a master device.

A Sync Frame from a Foreign Cluster

When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:
If the timestamp (e.g. TSF value) in the sync frame from the foreign cluster is larger than the time in one's own cluster, the device moves its operations to the foreign cluster.

Alternatively some other information in the sync frame from the foreign cluster is analyzed to determine whether the device moves its operations to the foreign cluster.

Otherwise the device continues its operations in the current cluster.

Moving Operations to a New Cluster

When a NAN device operates in a network of synchronized clusters, it shall do as follows when moving its operations to a new cluster upon detecting the existence of the new cluster through passive discovery:
a) If the device is a master device in the current/old cluster, the rules are as follows:
The device transmits as a master device in the current/old cluster at least one sync frame that contains information about the new cluster. This includes information at least about TSF value and discovery window schedule of the new cluster.
Once the device has transmitted at least one sync frame in the current/old cluster with information about the new cluster, it shall start operating in the new cluster and ceases all the operations in the old cluster.
b) If the device is a non-master device in the current/old cluster, the rules are as follows:
The device shall start operating in the new cluster and ceases all the operations in the old cluster.

When a NAN device operates in a network of isolated clusters, it shall do as follows when moving its operations to a new cluster:
a) Regardless of whether the device is a master or a non-master device in the current/old cluster, the device shall start operating in the new cluster and ceases all the operations in the old cluster.

Aligning Discovery Window Schedules

When a NAN device operates in a network of synchronized clusters, it shall do as follows upon detecting the existence of the new cluster from a received sync frame that contains information about the new cluster and the new cluster is indicated to be the one whose discovery window is to be used:
a) If the device is a master device in the current/old cluster, the rules are as follows:
The device may transmit as a master device in the current/old cluster at least one sync frame that contains information about the new cluster.
The device starts using the discovery window schedule of the new cluster.
The device may activate passive discovery to find out whether it can detect the new cluster and whether it can receive sync frames from the new cluster with high enough signal level in order to synchronize from perspective of sync frame transmissions.
b) If the device is a non-master device in the current/old cluster, the rules are as follows:
The device starts using the discovery window schedule of the new cluster.
The device may activate passive discovery to find out whether it can detect the new cluster and whether it can receive sync frames from the new cluster with high enough signal level in order to synchronize from perspective of sync frame transmissions.

D. Hop Count Usage in NAN Cluster Selection

FIG. 1 illustrates an example network diagram of two neighbor awareness network (NAN) clusters 100A and 100B and a wireless device 110 in discovery mode. A set of NAN devices that operate in a NAN network with one NAN ID and that are synchronized with respect to both the sync frame transmissions and the discovery windows, form a NAN cluster. A NAN device in a NAN cluster will be either an anchor master device, a master device, a sync device, or a non-sync device. An anchor master, such as anchor master A in NAN cluster 100A, is the NAN device that has the highest master rank in the NAN cluster. A NAN master device, such as master device M2(A) in cluster 100A, sends discovery and synchronization beacons. A NAN sync device, such as sync device S5(A) in cluster 100A, sends synchronization beacons. A NAN device in the non-sync state, such as non-sync device N6(A) in cluster 100A, does not send beacons. Each NAN cluster 100A and 100B includes a NAN anchor master A and B, respectively, whose TSF (time synchronization function) value is distributed in beacon frames to all the devices in the respective cluster.

For example, NAN cluster 100A includes NAN anchor master A whose TSF value TSF(A) is transmitted in its beacon frame B(A).

NAN master M2(A) in NAN cluster 100A, receives beacon B(A) in a first hop and transmits its beacon B(M2)(A).

NAN master M3(A) in NAN cluster 100A, receives beacon B(M2)(A) in a second hop and transmits its beacon B(M3)(A).

NAN master M4(A) in NAN cluster 100A, receives beacon B(M3)(A) in a third hop and transmits its beacon B(M4)(A).

Wireless device 110 in discovery mode receives beacon B(M4)(A) in a fourth hop.

The hop count is incremented by one as each master consecutively transmits its beacon in the hop sequence. The hop count value of 4 corresponding to the distance from the anchor master A to the final sending master M4(A), is communicated in the beacon frame B(M4)(A), which is received by the wireless device 110.

In another example, NAN cluster 100B includes NAN anchor master B whose TSF value TSF(B) is transmitted in its beacon frame B(B).

NAN master M2(B) in NAN cluster 100B, receives beacon B(B) in a first hop and transmits its beacon B(M2)(B).

NAN master M3(B) in NAN cluster 100B, receives beacon B(M2)(B) in a second hop and transmits its beacon B(M3)(B).

Wireless device 110 in discovery mode receives beacon B(M3)(B) in a third hop.

The hop count is incremented by one as each master consecutively transmits its beacon in the hop sequence. The hop count value of 3 corresponding to the distance from the anchor master B to the final sending master M3(B), is communicated in the beacon frame B(M3)(B), which is received by the wireless device 110.

An anchor master of a cluster is the device that has the highest master rank in the cluster. Each device maintains a master rank value that represents the willingness of the device to operate as master. A higher numerical master rank value means a higher master preference. Each beaconing device communicates its master rank information to other devices in its beacon frames. This received master rank information is used by each device receiving a beacon, to determine which master device is the anchor master whose TSF is to be followed. Master rank is expected to comprise of three components: 1) master preference value, 2) random number, 3) device's MAC address. It may be that these three components are communicated in the beacon frames instead of the master rank itself. A device's rank also determines whether the device needs to assume the role as a master device that transmits beacons. When a master device transmits beacons, it not only communicates its own master rank and its own TSF value, but it also transmits information about the anchor master's master rank and the hop count distance from the anchor master to the transmitting device. The beacon frames contain all the information needed to synchronize in a cluster. In accordance with an example embodiment of the invention, the information in the beacons may be used by discovering devices to determine in which cluster they should select to operate in.

FIG. 2 shows an example format of a beacon packet 140 transmitted by a master device in a NAN cluster, in accordance with at least one embodiment of the present invention. The beacon packet includes fields for destination address 232, source address 234, cluster ID 236, anchor master TSF 238, hop count to anchor 240, master rank of anchor master 242, master rank of sender 244, and a cyclic redundancy code (CRC) 246.

FIG. 2A shows the example format of a beacon packet of FIG. 2, as beacon B(M4)(A) transmitted by the final master device M4(A) in the first NAN cluster 100A. The beacon B(M4)(A) includes a first hop count of value 4 and a master rank value of 10 for the anchor master A in the NAN cluster 100A, in accordance with at least one embodiment of the present invention.

Figure 2B:
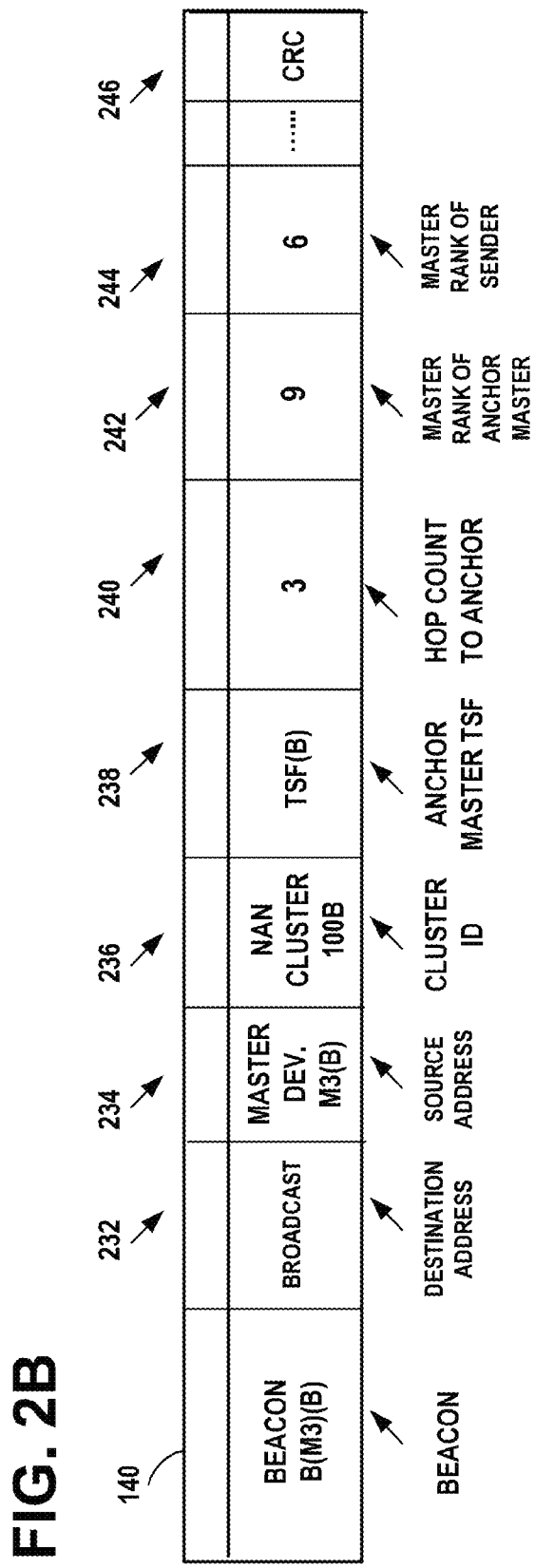
FIG. 2B shows the example format of a beacon packet of FIG. 2, transmitted by a master device in a second NAN cluster, the beacon including a first hop count of value 3 and a master rank value of 9 for the anchor master in that cluster, in accordance with at least one embodiment of the present invention.

FIG. 2B shows the example format of a beacon packet of FIG. 2, as beacon B(M3)(B) transmitted by the final master device M3(B) in the second NAN cluster 100B. The beacon B(M3)(B) includes a second hop count of value 3 and a master rank value of 9 for the anchor master B in the NAN cluster 100B, in accordance with at least one embodiment of the present invention.

Figure 3:
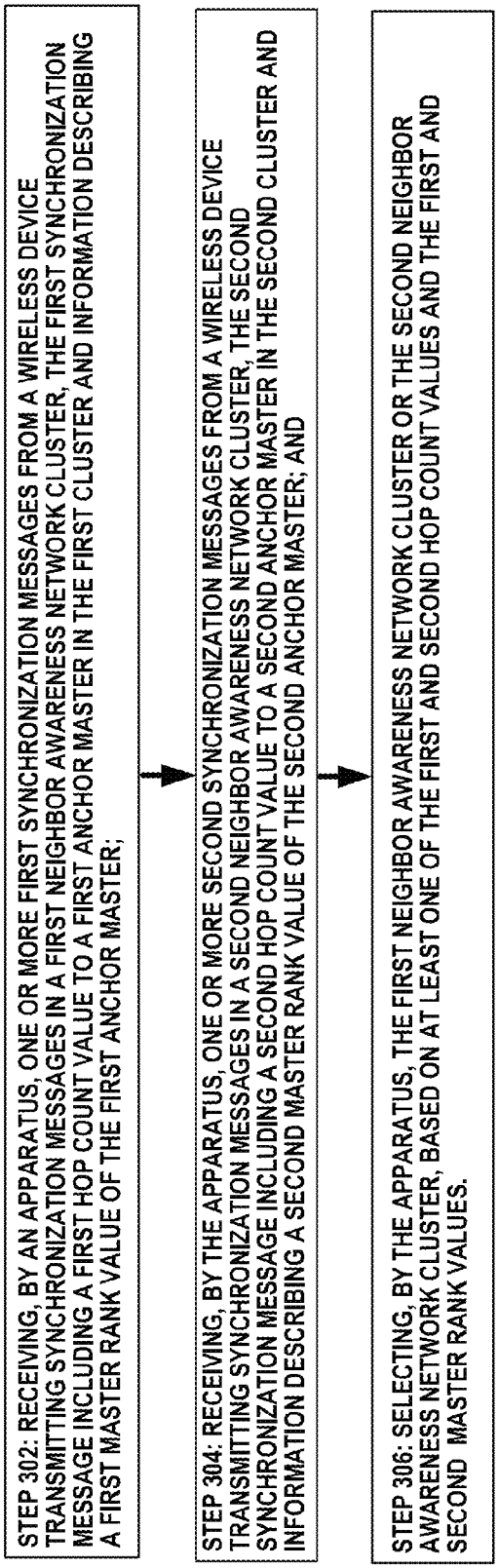
FIG. 3 is an example flow diagram of operational steps in the wireless device 110 of FIG. 1, making a determination as to which NAN cluster to join, in accordance with at least one embodiment of the present invention.

FIG. 3 is an example flow diagram 300 of operational steps in the wireless device 110 of FIG. 1, making a determination as to which NAN cluster to select, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302: receiving, by an apparatus, one or more first synchronization messages from a wireless device transmitting synchronization messages in a first neighbor awareness network cluster, the first synchronization message including a first hop count value to a first anchor master in the first cluster and information describing a first master rank value of the first anchor master;

Step 304: receiving, by the apparatus, one or more second synchronization messages from a wireless device transmitting synchronization messages in a second neighbor awareness network cluster, the second synchronization message including a second hop count value to a second anchor master in the second cluster and information describing a second master rank value of the second anchor master; and Step 306: selecting, by the apparatus, the first neighbor awareness network cluster or the second neighbor awareness network cluster, based on at least one of the first and second hop count values and the first and second master rank values.

According to an example embodiment of the invention, the method may continue by comparing, by the apparatus, the first and second hop count values and hop count values in synchronization messages received from one or more other neighbor awareness network cluster and selecting the neighbor awareness network cluster corresponding to the synchronization message having the lowest hop count value. For example, in the scenario shown in FIG. 1, the beacon B(M4)(A) transmitted by the final master device M4(A) in the first NAN cluster 100A, includes a first hop count of value 4, whereas the beacon B(M3)(B) transmitted by the final master device M3(B) in the second NAN cluster 100B includes a second hop count of value 3. Thus, the wireless device 110 may select the second NAN cluster 100B corresponding to a lower hop count of value.

According to an example embodiment of the invention, the method may continue by comparing, by the apparatus, the first and second master rank values and master rank values in synchronization messages received from one or more other neighbor awareness network cluster and selecting the neighbor awareness network cluster corresponding to the synchronization messages having the highest master rank value. For example, in the scenario shown in FIG. 1, the beacon B(M4)(A) transmitted by the final master device M4(A) in the first NAN cluster 100A, includes a master rank value of 10 for the anchor master A, whereas the beacon B(M3)(B) transmitted by the final master device M3(B) in the second NAN cluster 100B includes a master rank value of 9 for the anchor master B. Thus, the wireless device 110 may select the first NAN cluster 100A corresponding to a higher master rank value.

According to an example embodiment of the invention, the device that has performed passive scanning and has more than one cluster to select for operation selects the cluster using the hop count to anchor master value of each cluster as a criterion. The device selects the cluster with the lowest hop count value while respecting the other criteria like master rank and cluster size estimate.

The device faces this situation when
  a) It operates in a cluster and detects one or more other clusters
  b) It doesn't operate yet in a cluster and detects at least two clusters According to an example embodiment of the invention, when a device has performed scanning or has obtained information about available clusters with some other means and it has more than one cluster to select from, it ranks the clusters using at least the following information about the clusters: a) anchor master rank, b) hop count to anchor master. This information is obtained e.g. from beacon frames transmitted by devices operating in the clusters.

Ranking Alternative 1:

First, a device ranks clusters based on the anchor master rank value and selects the cluster with the highest anchor master rank value. If there are multiple clusters with the highest anchor master rank value, the device selects the cluster with the highest anchor master rank value and the lowest hop count value. If there are multiple clusters with the highest anchor master rank value and the lowest hop count value, the device selects the cluster from which the beacon frame was received with the highest signal level.

Ranking Alternative 2:

First, a device ranks clusters based on the hop count value and selects the cluster with the lowest value. If there are multiple clusters with the lowest hop count value, the device selects the cluster with the highest anchor master rank value and the lowest hop count value. If there are multiple clusters with the highest anchor master rank value and the lowest hop count value, the device selects the cluster from which the beacon frame was received with the highest signal level.

FIG. 4 is an example functional block diagram of the wireless device 110 in discovery mode receiving a beacon B(M3)(B) from master device M3(B) in the NAN cluster 100B, in accordance with at least one embodiment of the present invention.

In an example embodiment of the invention, the wireless device 110 and the wireless master device M3(B) may be a communications device, PDA, cell phone, laptop or palmtop computer, or the like or it may be a stationary access point, automotive dashboard interface, home electronics interface or other stationary interface or device. The wireless device 110 and the wireless master device M3(B) may be a remote controller, healthcare monitor, sports sensor, token, key fob, watch, wireless keyboard, gaming pad, body sensor, toy, health care equipment, human interface device, entertainment device, wireless microphone, GPS sensor, or the like.

In an example embodiment of the invention, the wireless device 110 and the wireless master device M3(B) may include a processor 220 that includes a single core or multi-core central processing unit (CPU) 260 and 261, a random access memory (RAM) 262, a read only memory (ROM) 264, and interface circuits 266 to interface with the radio transceiver 208. The wireless device 110 and the wireless master device M3(B) may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an example embodiment of the invention, the wireless device 110 and the wireless master device M3(B) each include the awareness protocol stack 202.

In an example embodiment of the invention, the awareness protocol stack 202 may include the NAN discovery engine 205 and the MAC with NAN support 210. In an example embodiment of the invention, the awareness protocol stack 202 may include an Awareness Layer, Community Layer, Network Layer, and Link Layer.

In an example embodiment of the invention, the processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the wireless device 110 and the wireless master device M3(B) from a computer program product or article of manufacture in the form of computer-usable media such as resident memory devices, smart cards or other removable memory devices, as illustrated in FIG. 5. Alternately, they may be embodied as integrated circuit logic in the form of programmed logic arrays or custom designed application specific integrated circuits (ASIC). The radio 208 in the each of the wireless device 110 and the wireless master device M3(B) may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the wireless device 110 and the wireless master device M3(B) for execution of the program code for example by the CPUs 260 and/or 261. Removable storage media 126 are shown in FIG. 5.

FIG. 5 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

Although specific example embodiments have been disclosed, a person skilled in the art will understand that changes can be made to the specific example embodiments without departing from the spirit and scope of the invention.

What is claimed is:

1. A method, comprising:
    receiving, by an apparatus, one or more first synchronization messages from a wireless device transmitting synchronization messages in a first neighbor awareness network cluster, the first synchronization message including a first hop count value to a first anchor master in the first cluster and information describing a first master rank value of the first anchor master;
    receiving, by the apparatus, one or more second synchronization messages from a wireless device transmitting synchronization messages in a second neighbor awareness network cluster, the second synchronization message including a second hop count value to a second anchor master in the second cluster and information describing a second master rank value of the second anchor master; and
    comparing, by the apparatus, the first and second master rank values and selecting the neighbor awareness network cluster corresponding to the synchronization message having the greater master rank value.

2. The method of claim 1, further comprising:
    comparing, by the apparatus, the first and second hop count values and selecting the neighbor awareness network cluster corresponding to the synchronization message having the lower hop count value.

3. The method of claim 1, further comprising:
    comparing, by the apparatus, the first and second hop count values and hop count values in synchronization messages received from one or more other neighbor awareness network cluster and selecting the neighbor awareness network cluster corresponding to the synchronization message having the lowest hop count value.

4. The method of claim 1, further comprising:
    comparing, by the apparatus, the first and second master rank values and master rank values in synchronization messages received from one or more other neighbor awareness network cluster and selecting the neighbor awareness network cluster corresponding to the synchronization messages having the highest master rank value.

5. The method of claim 1, further comprising:
    comparing, by the apparatus, the first and second hop count values and operating in the neighbor awareness network cluster corresponding to the synchronization message having the lower hop count value.

6. The method of claim 1, further comprising:
    comparing, by the apparatus, the first and second master rank values and operating in the neighbor awareness network cluster corresponding to the synchronization message having the greater master rank value.

7. The method of claim 1, further comprising:
    performing, by the apparatus, passive scanning of the synchronization messages.

8. An apparatus, comprising:
    at least one processor;
    at least one memory including computer program code;
    the at least one memory and the computer program code configured to, with the at least one processor, cause the apparatus at least to:
    receive one or more first synchronization messages from a wireless device transmitting synchronization messages in a first neighbor awareness network cluster, the first synchronization message including a first hop count value to a first anchor master in the first cluster and information describing a first master rank value of the first anchor master;
    receive one or more second synchronization messages from a wireless device transmitting synchronization messages in a second neighbor awareness network cluster, the second synchronization message including a second hop count value to a second anchor master in the second cluster and information describing a second master rank value of the second anchor master; and
    compare the first and second master rank values and select the neighbor awareness network cluster corresponding to the synchronization message having the greater master rank value.

9. The apparatus of claim 8, further comprising:
    the at least one memory and the computer program code configured to, with the at least one processor, cause the apparatus at least to:
    compare the first and second hop count values and selecting the neighbor awareness network cluster corresponding to the synchronization message having the lower hop count value.

10. The apparatus of claim 8, further comprising:
    the at least one memory and the computer program code configured to, with the at least one processor, cause the apparatus at least to:
    compare the first and second hop count values and hop count values in synchronization messages received from one or more other neighbor awareness network cluster and selecting the neighbor awareness network cluster corresponding to the synchronization message having the lowest hop count value.

11. The apparatus of claim 8, further comprising:
    the at least one memory and the computer program code configured to, with the at least one processor, cause the apparatus at least to:
    compare the first and second master rank values and master rank values in synchronization messages received from one or more other neighbor awareness network cluster and selecting the neighbor awareness network cluster corresponding to the synchronization messages having the highest master rank value.

12. The apparatus of claim 8, further comprising:
    the at least one memory and the computer program code configured to, with the at least one processor, cause the apparatus at least to:
    compare the first and second hop count values and operating in the neighbor awareness network cluster corresponding to the synchronization message having the lower hop count value.

13. The apparatus of claim 8, further comprising:
    the at least one memory and the computer program code configured to, with the at least one processor, cause the apparatus at least to:

compare the first and second master rank values and operating in the neighbor awareness network cluster corresponding to the synchronization message having the greater master rank value.

14. The apparatus of claim 8, further comprising:
the at least one memory and the computer program code configured to, with the at least one processor, cause the apparatus at least to:
perform, by the apparatus, passive scanning of the synchronization messages.

15. A computer program product comprising computer executable program code recorded on a computer readable non-transitory storage medium, the computer executable program code comprising:
code for receiving, by an apparatus, one or more first synchronization messages from a wireless device transmitting synchronization messages in a first neighbor awareness network cluster, the first synchronization message including a first hop count value to a first anchor master in the first cluster and information describing a first master rank value of the first anchor master;
code for receiving, by the apparatus, one or more second synchronization messages from a wireless device transmitting synchronization messages in a second neighbor awareness network cluster, the second synchronization message including a second hop count value to a second anchor master in the second cluster and information describing a second master rank value of the second anchor master; and
code for comparing, by the apparatus, the first and second master rank values and selecting the neighbor awareness network cluster corresponding to the synchronization message having the greater master rank value.

16. The computer program product of claim 15, further comprising:
code for comparing, by the apparatus, the first and second hop count values and selecting the neighbor awareness network cluster corresponding to the synchronization message having the lower hop count value.

17. The computer program product of claim 15, further comprising:
code for performing, by the apparatus, passive scanning of the synchronization messages.

* * * * *